United States Patent [19]

Robinson et al.

[11] Patent Number: 5,788,596

[45] Date of Patent: Aug. 4, 1998

[54] TRANSMISSION AND CONTROL WITH OUTPUT SHAFT BRAKING

[75] Inventors: Timothy Alan Robinson, Indianapolis; Jill Ann Hampton, Zionsville, both of Ind.

[73] Assignee: General Motors Corporation, Detroit, Mich.

[21] Appl. No.: 748,461

[22] Filed: Nov. 8, 1996

[51] Int. Cl.⁶ ............................. F16H 57/10; F16H 61/20
[52] U.S. Cl. .................... 475/118; 475/271; 475/900; 477/114
[58] Field of Search ........................ 475/116, 118, 475/254, 271, 296, 900; 192/4 A; 477/93, 114

[56] References Cited

U.S. PATENT DOCUMENTS

| | | | |
|---|---|---|---|
| 2,682,787 | 7/1954 | Holdeman | 475/118 |
| 3,017,788 | 1/1962 | Polomski | 475/118 |
| 3,300,001 | 1/1967 | Stockton | 475/900 |
| 4,784,020 | 11/1988 | Hamano et al. | 477/93 |
| 4,840,092 | 6/1989 | Sakaguchi et al. | 477/93 |
| 4,883,151 | 11/1989 | Tobler | 192/4 A |
| 5,620,386 | 4/1997 | Jamzadeh | 475/116 |

Primary Examiner—Charles A. Marmor
Assistant Examiner—Sherry Lynn Estremsky
Attorney, Agent, or Firm—Donald F. Scherer

[57] ABSTRACT

A power transmission has an electro-hydraulic control for selectively establishing a plurality of clutches and brakes for controlling a plurality of planetary gearsets to establish the transmission drive ratios. During a vehicle stopped condition, two brakes are engaged to restrain rotation of two members of one of the planetary gear sets. This results in braking of the transmission output shaft.

3 Claims, 4 Drawing Sheets

| RANGE | | CLUTCHES APPLIED | | | | |
|---|---|---|---|---|---|---|
| | | C1 | C2 | C3 | C4 | C5 |
| FWD | 1 | X | | | | X |
| | 2 | X | | | X | |
| | 3 | X | | X | | |
| | 4 | X | X | | | |
| | 5 | | X | X | | |
| | 6 | | X | | X | |
| REV | | | | X | | X |
| NEUT | | | | | | X |

TRANSMISSION AND CONTROL WITH OUTPUT SHAFT BRAKING

TECHNICAL FIELD

This invention relates to power transmission in vehicles, and more particularly, to controlling the transmission friction devices when the vehicle is at rest.

BACKGROUND OF THE INVENTION

Hill hold devices, generally operate during engagement of the service brakes when the vehicle is at rest. These devices are effective to maintain the service brake actuated and therefore the wheels in a locked condition, until the throttle is depressed by the operator. These devices are usually associated with manually shifted transmissions.

Systems using these devices permit the operator to control the vehicle clutch with the left foot and the vehicle throttle with the right foot simultaneously, thus permitting a smooth start when sitting on a rise. Automatic shifting transmissions have not incorporated similar devices since the operator can rely on the torque converter and service brakes simultaneously to hold the vehicle on a grade during a stop or standing condition.

SUMMARY OF THE INVENTION

It is an object of the present invention to provide an improved transmission and control having positive retention of the output shaft when the vehicle is at rest.

In one aspect of this invention, a friction brake is engaged in addition to one or more of the friction devices normally engaged for vehicle low speed operation. Engagement of the additional brake results in preventing relative rotation in the transmission gearsets and therefore restrains rotation of the vehicle output shaft.

In another aspect of this invention, the brake for controlling the planetary gearing during second speed operation is engaged when the vehicle is at rest and the clutch and brake provided for the first forward speed are engaged or at least the brake for providing the first forward speed is engaged. This results in the planetary gearset connected with the output shaft to be grounded.

DESCRIPTION OF AN EXEMPLARY EMBODIMENT

Figure 1:
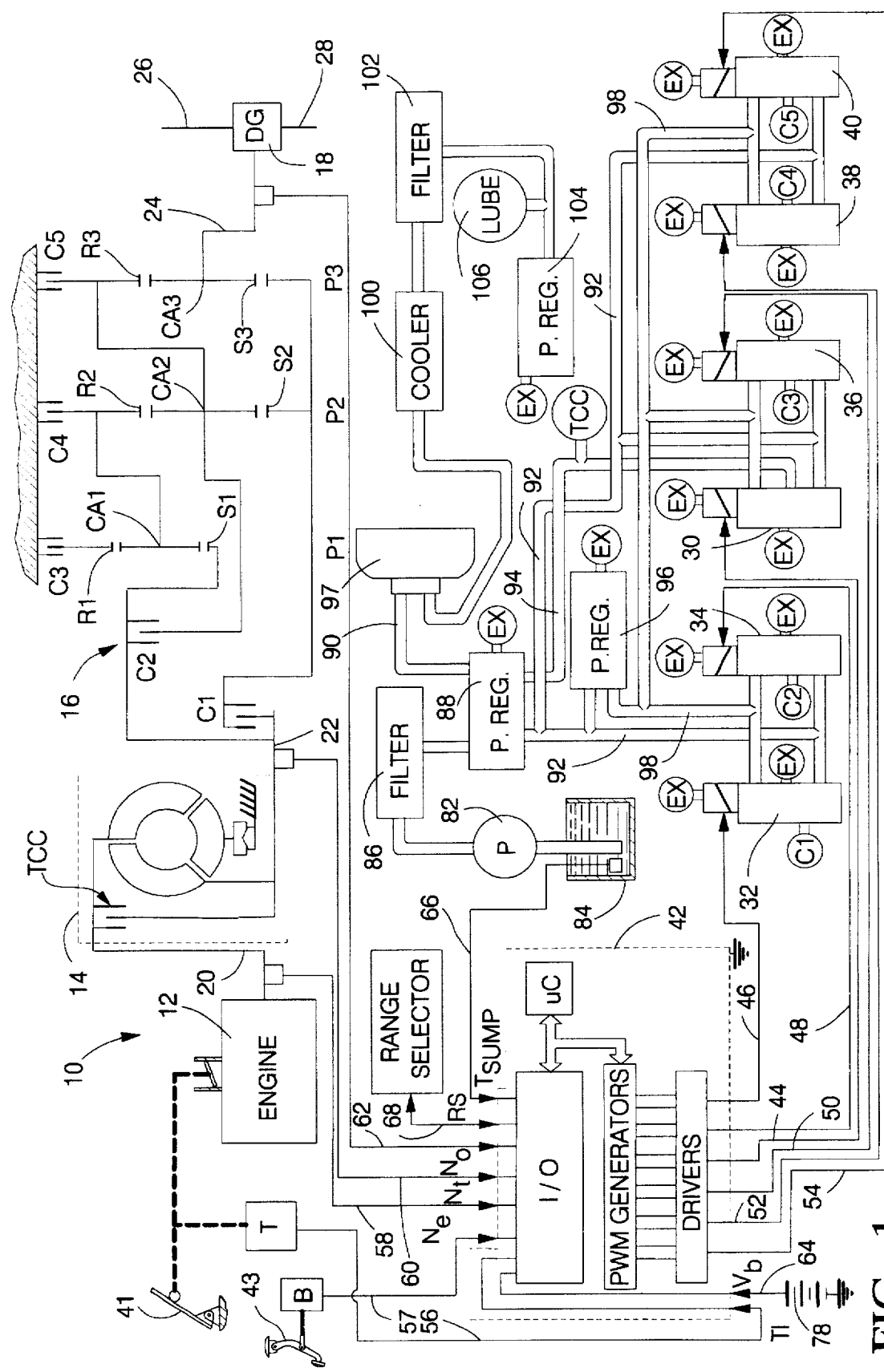
FIG. 1 is a diagrammatic and schematic representation of a transmission and a computer based control.

Referring to the drawings, and particularly to FIG. 1, the reference numeral 10 generally designates a motor vehicle drivetrain including a throttle controlled internal combustion engine 12, a fluid torque converter 14, a six speed fluid operated power transmission 16 and a differential gearset 18. The engine 12 is connected to the torque converter 14 through a shaft 20 and the torque converter 14 is connected to the transmission 16 through a shaft 22. The transmission 16 is connected to the differential gearset 18 through an output shaft 24 and the differential gearset 18 is connected to a pair of drive wheels (not shown) through output shafts 26 and 28.

The transmission 16 is comprised of three planetary gearsets P1, P2 and P3 which are interconnected between the shaft 22 and the transmission output shaft 24. The planetary gearset P1 includes a sun gear S1, a ring gear R1 and a carrier assembly CA1. The planetary gearset includes a sun gear S2, a ring gear R2 and a carrier assembly CA2. The planetary gearset P3 includes a sun gear S3, a ring gear R3 and a carrier assembly CA3. These planetary gearsets P1, P2 and P3 are connected with selectively operable friction devices C1, C2, C3, C4 and C5. The friction devices C1 and C2 are rotating fluid clutches and the friction devices C3, C4 and C5 are stationary fluid clutches or brakes.

The torque converter 14 has included in the assembly thereof a torque converter clutch (TCC) which also a selectively operable friction device. The clutches TCC, C1, C2 and brakes C3, C4 and C5 are selectively engaged and disengaged by solenoid operated control valves 30, 32, 34, 36, 38 and 40 according to the chart shown in FIG. 2. The selective engagement of the devices will result in the desired transmission speed ratio or in a neutral condition.

During neutral operation, the friction device C5 is engaged. This device is also engaged for reverse and for the first and lowest forward speed range. Therefore, the shift from neutral to reverse requires only the engagement of a single friction device, that is the C1 clutch for forward operation, and the C3 brake for reverse operation. A more complete description of the operation of the transmission planetary gearset shown is recited in U.S. Pat. No. 4,070,927 issued to Polak, Jan. 31, 1978, and assigned to the assignee of the present application.

The powertrain has an operator manipulated accelerator or throttle pedal 41 through which the operator controls the engine throttle for establishing the engine fuel feed and therefore power output. An operator controlled brake pedal 43 controls the operation of vehicle brakes B which are actuated during speed retardation or vehicle stopping. The operation of the solenoid controlled valves 30 through 40 is controlled by a computer based control unit 42 through lines 44 through 54 in response to various input signals representative of system parameters. Such inputs include an engine throttle position signal T1 on line 56, an engine brake signal on line 57, an engine output speed signal Ne on line 58, a torque converter output speed signal Nt on line 60, a transmission output speed signal No on line 62, a system supply voltage signal Vb on line 64, a transmission fluid temperature signal Tsump on line 66, and an operator range selector signal Rs on line 68. The system voltage is supplied by the storage battery 78 and the electrical signals are obtained with conventional electrical transducers such as potentiometers, thermistors and magnetic speed pickups.

Internally, the unit 42 comprises a number of conventional devices including a micro-computer (uC) with an internal clock and memory, and input/output device (I/O) and an array of pulse-width-modulated generators (PWM) and drivers (DR). A PWM generator and a driver DR dedicated to each solenoid controlled valve 30 through 40. The PWM outputs are delivered to the respective drivers DR and are used to energize their respective solenoid control valves. The duty cycle of the PWM outputs determines the hydraulic pressure supplied by the solenoid control valves, with a low percent duty cycle yielding a low pressure and a high percent duty cycle yielding a high pressure in a normally closed hydraulic valve.

The hydraulic circuit for the transmission 16 includes a positive displacement pump 82 for supplying pressurized hydraulic fluid from a sump or reservoir 84 to the clutches TCC and friction devices C1 through C5 to various hydraulic and electro-hydraulic valving mechanisms. After delivery to a main circuit filter 86, the fluid output of pump 82 is directed to a main pressure regulator valve 88 which develops regulated fluid pressure in lines 90 and 92 in a well known manner.

The fluid pressure in line 90 is referred to a torque converter feed pressure and is directed through the torque converter 14, as schematically designated by a torque converter shell 97. After passing through a cooler 100 and filter 102, the converter fluid is then regulated down to a lower pressure by regulator valve 104 and directed to a transmission lube circuit as designated at 106. The pressure regulator 104 is a conventional exhaust check valve which maintains a minimum pressure level within the fluid line.

The fluid pressure in line 92 is the highest fluid pressure within the system and is generally referred to as main or line pressure. This fluid pressure is supplied to the clutch control valves 30 through 40, and also to a control pressure regulator valve 96. The control pressure regulator valve 96 develops a lower constant pressure in a line 98 which is the control pressure utilized by the solenoids to control the respective valves.

A pressure line 94 is also connected with the regulator valve 88 and has a pressure level similar to that pressure level in line 90. The fluid in line 94 is generally referred to as the torque converter clutch feed pressure and is supplied by the solenoid 30 to the torque converter clutch TCC to enforce engagement thereof. This pressure in line 94 can also be used as feedback or knockdown pressure to reduce the main pressure output of valve 88 when the torque converter is in the engaged mode.

Figures 2, 3:
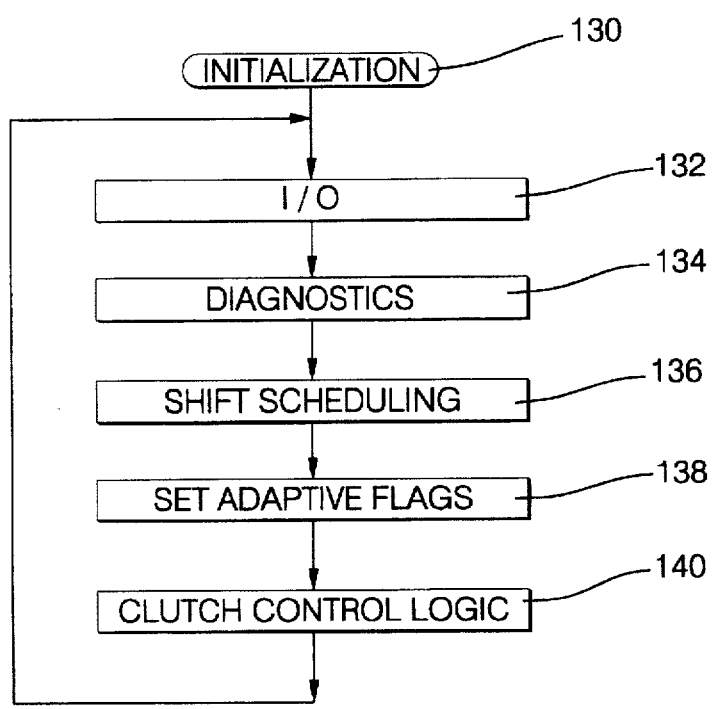
FIG. 2 is a chart describing the clutch and brake actuation of the transmission described in FIG. 1.
FIG. 3 is a flow diagram representing computer program instructions for the computer based control.

FIG. 3 represents an executive or main loop program which directs the sequential execution of various subroutines within the computer based control unit 42. Block 130 designates a series of instructions executed at the initiation of each period of vehicle operation for setting various timers, registers and variable values of control unit 42 to predetermined initial values. Thereafter, blocks 132 through 140 are sequentially and repeatedly executed as indicated by the flow diagram lines.

Figure 5:
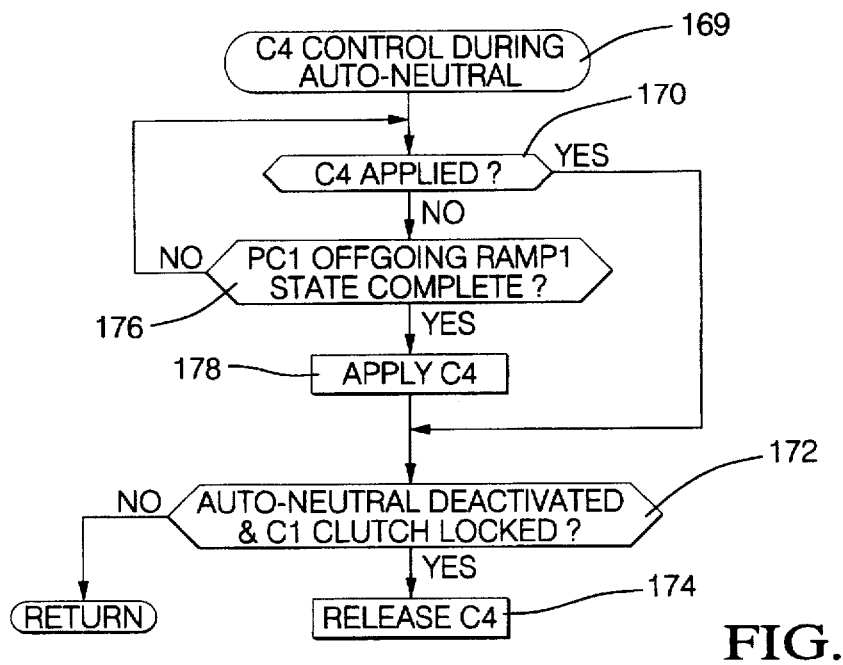
FIGS. 5, 6 and 7 are flow diagrams representing program instructions for the computer based control.
Figure 6:
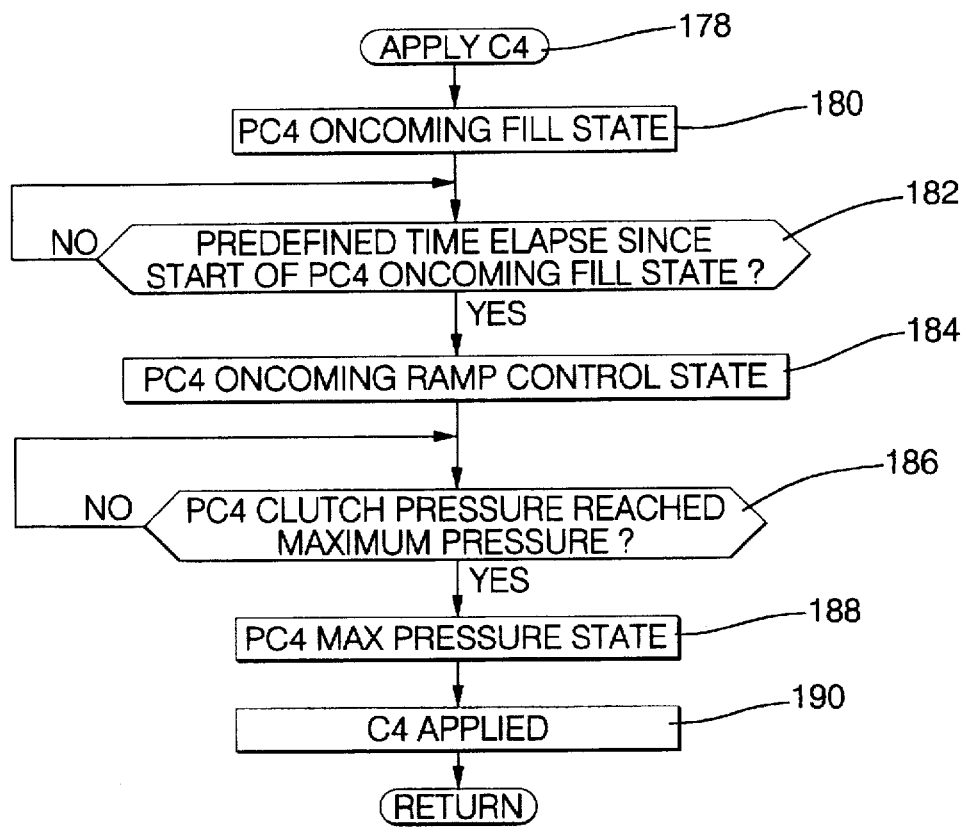
Figure 7:
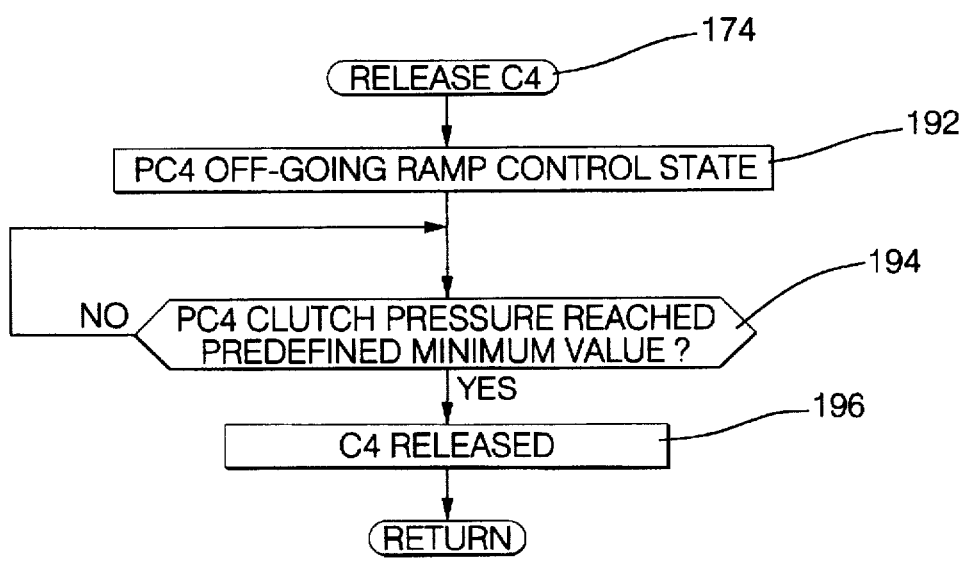

Block 132 reads the various input signal values and outputs the required control signals to the PWM generators and drivers for solenoid control valves 30 through 40. The blocks 134 through 138 contain diagnostic shift scheduling and adaptive flag logic. The clutch control logic block 140 analyses the various system input signals, described above in reference to FIG. 1, develops pressure command signals for application to the solenoid operated control valves at the next execution of block 132, and computes adaptive corrections based on the adaptive flags which might be set during operation. The block 140 also depicts pulse-width-modulation of the solenoid drive voltage to carry out the pressure commands for specific shift operation with the transmission. A portion of the transmission operation controlled by the clutch control logic of block 140 is seen in FIGS. 5, 6 and 7, wherein the friction devices are controlled to establish a neutral condition within the transmission.

It should be noted in FIG. 1 that the friction device C5 is engaged in the low forward and in the reverse drive as well as neutral, as previously mentioned. However, if brake C4 or friction device C4 is simultaneously engaged with the friction device C5, the following will occur. Ring gear R2 is stationary, ring gear R3 is stationary, carrier assembly CA2 is stationary. Therefore, the ring gear R2, carrier assembly CA2 and sun S2 are stationary, the sun S3 is also stationary since it is connected with S2 and therefore the carrier assembly CA3 is stationary since it is connected with both R3 and S3 which are stationary. Thus, the output shaft 24 and therefore the vehicle output shafts 26 and 28 are all stationary when both C4 and C5 are engaged. With both C4 and C5 engaged, C1 can also be engaged if low forward gear has been established, or C3 can be engaged if reverse gear has been established. The engagement of C4 will not affect the operation of C1 and C2.

The co-pending application U.S. Ser. No., 08/745,964, filed Nov. 1996 and assigned to the assignee of this application, describes a control for an automatic transmission wherein the friction device C1 is disengaged to a predetermined level whenever the vehicle reaches an "at rest" condition and certain vehicle parameters are met. The invention and control system described in the above-mentioned patent application can be utilized with the present invention, and therefore the discussion to follow of FIG. 4 will describe both the auto-neutral methodology of U.S. Ser. No. 08/745,964 and the drive shaft retention of the present invention.

Figure 4:
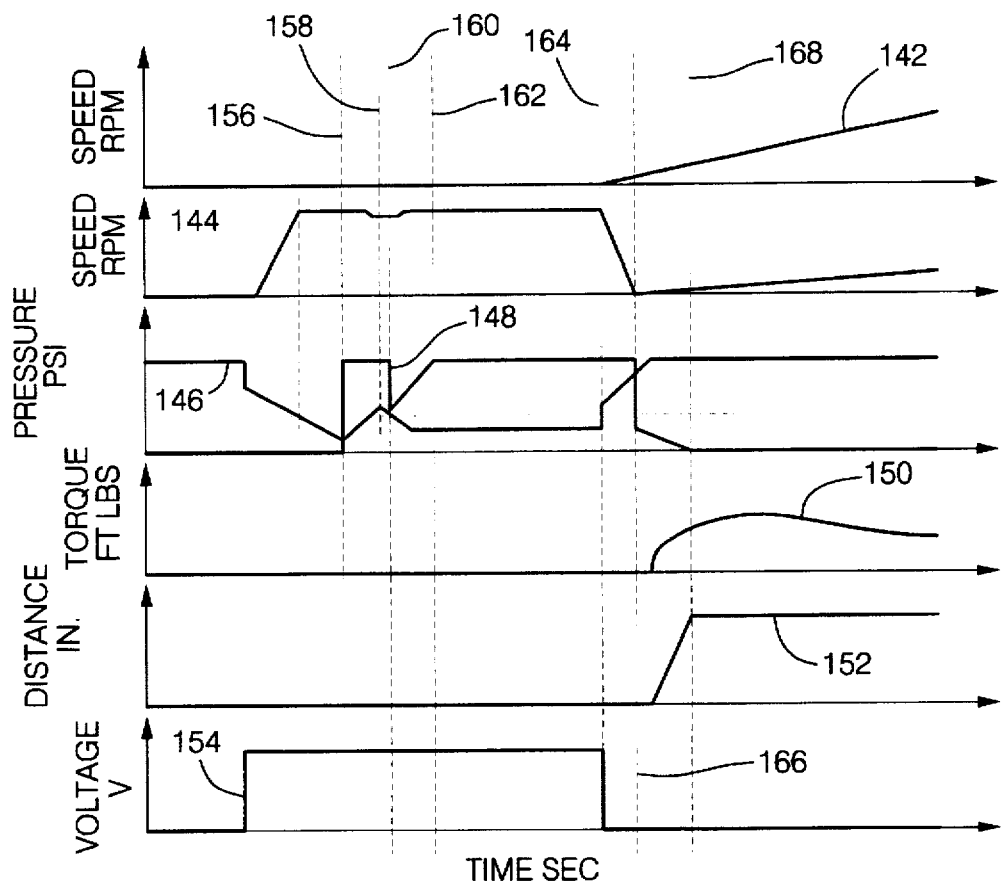
FIG. 4 is a graph of operator parameters versus time.

In reviewing FIG. 4, it is seen that the following vehicle parameters are shown: engine speed via line 142, torque converter turbine speed via line 144, C1 friction device pressure line 146, C4 friction device pressure line 148, driver torque demand line 150, throttle position line 152, and an auto/neutral condition line 154.

As described in the above-mentioned co-pending application, the auto/neutral control is established whenever the input and output speeds of the planetary gearset are zero and the vehicle brakes are applied and the engine throttle is in idle. Another condition also required of the auto/neutral is that at least the low forward ratio is established.

The line describing the pressure of device C1 is shown at 146 and when the auto/neutral command is activated, the pressure in the C1 device is ramped down or pressure is decreased in the device until the turbine is released and accelerates to a predetermined value. The algorithm for the auto/neutral will ensure the occurrence of the torque turbine speed stability at line 156. The C1 pressure is then increased until the turbine speed begins to react and decrease in speed, and this is established by the algorithm at line 158. Shortly after or substantially simultaneously with the line 156, the fluid pressure in friction device C4 is raised significantly to a maximum system value and is maintained for a predetermined period of time by the control device until the line 160 is achieved. This time between lines 156 and 160 is the time required to fill the apply chamber of the friction device and move the apply piston of the C4 device to a point where friction engagement is initiated. At this time, along line 160, the fluid pressure in the C4 device is decreased to a predetermined value and then increased in a ramp fashion until line 162 is reached. During the ramping of the pressure in the friction device C4, the pressure is increased to the maximum system value.

At line 164, in FIG. 4, the auto/neutral command is deactivated and the fluid pressure in the C1 friction device is increased resulting in a decrease in the speed of the turbine as represented by line 144. The pressure in the C1 device is increased in ramp fashion to bring the turbine speed down to a zero value. At a predetermined pressure in the C1 device, the C4 device pressure is permitted to exhaust. This occurs at line 166. The exhausting of the fluid pressure in the C4 device occurs when the system control senses the C1 pressure is sufficient to carry torque at the C1 device. Following the initial decrease of pressure in the C4 friction device, the pressure is then decreased in ramp fashion until line 168 is reached and the C4 pressure is zero and the vehicle is underway.

The controlling of the C4 friction device is accomplished by the computer based control during the performance of the program command shown in FIG. 3. Whenever the program commands reach the box 140, which represents the clutch control logic subroutine, an auto/neutral subroutine is run in a manner as described in the above co-pending application.

If the control system finds that the auto/neutral system is in operation block 169, the program subroutine shown in FIG. 5 will occur. During this subroutine, the computer first checks to determine if device C4 is applied at decision block 170 and if "YES", the subroutine then checks at block 172 to determine if the auto/neutral has been deactivated and if so, the subroutine will perform the release of C4 at block 174. If the decision block 172 determines that the auto/neutral is not deactivated, then the subroutine returns to the main program.

If the C4 device has not been applied at decision block 170, the computer program will continue the decision making process of the decision block 176. This determines if the C1 pressure has been ramped down sufficiently to begin the start of the C4 pressure and the program passes to the block 178 which commands the application of the C4 friction device.

The computer commands the valve mechanism to provide for filling the C4 device at block 180 and then determines if the predetermined time to fill the apply cavity and move the piston to the apply position has been achieved in block 182. When this is completed, the command in block 184 will control the on-coming ramp pressure of the C4 device between lines 160 and 162 in FIG. 4. While this is occurring, a decision block 186 is queried to determine if the maximum system pressure which will occur at line 162 has in fact occurred, and if so, then it determines that C4 is at the maximum pressure in block 188. Following the setting of the maximum system pressure and the apply of C4 at block 190, the program subroutine will return to the main routine.

The computer will, of course, run through this set of signals whenever instruction block 140 is encountered to determine what events should occur and, following the release of the auto/neutral signal and the block 172 being queried, the program will determine at line 164 of FIG. 4 has indeed been reached, the C1 clutch is being activated. The program will determine that at line 166 that the C1 friction device does have sufficient pressure to carry the torque load and therefore will command the release of C4 at block 192.

Following the initial decrease along line 166 of the pressure in device C4, the decision block 194 will determine that during the ramp down phase between lines 166 and 168, that the minimum value of pressure in the C4 device has been reached. When this occurs, the C4 device is released at block 196 and the program will be returned to the main routine.

While the above control system for the retention of the output shaft is described in the preferred structure as being utilized with the auto/neutral, this is not a requirement. Should the device be used without an auto/neutral control system, the algorithm in FIG. 5 would determine that the following things had occurred: the vehicle was "at rest"; i.e., the output shaft speed is zero, the input speed of the device is zero, that is the input shaft to the transmission (shaft 22) has a zero speed, the throttle 41 has been moved to the minimum throttle position less than ten percent full throttle, and the brake 43 has been engaged. These conditions being satisfied would ensure that the vehicle was "at rest" and the operator had intended to stop and be at rest. Under these conditions, the friction device C4 can be engaged with or without the deactivation of the friction device C1.

These same routines, as described in FIGS. 6 and 7, will occur. The subroutine of FIG. 5 at block 172 will simply determine if the engine throttle has been manipulated (greater than ten percent) to suggest an increase in vehicle speed is requested and the C4 device will be deactivated according to the algorithm of FIG. 7.

Also, the above embodiment as described for the forward direction of vehicle travel can be applied equally well in the reverse mode of vehicle travel. In other words, if friction device C3 and C5 are engaged, the computer control will know that the transmission has been conditioned for reverse operation. If the other system operating parameters signify that the vehicle is "at rest" and the operator intends the vehicle to be "at rest", the device C4 can be engaged with or without the disengagement of the device C3. Therefore, it should be appreciated that automatic transmissions which utilize a planetary gear arrangement can, through the successful engagement of two friction brakes, maintain the transmission output shaft at a zero speed value under predetermined conditions.

Obviously, many modifications and variations of the present invention are possible in light of the above teaching. It is therefore to be understood, that within the scope of the appended claims, the invention may be practiced otherwise than as specifically described.

We claim:

1. A power transmission and control in a vehicle comprising:

an input shaft;

an output shaft;

a plurality of interconnected planetary gear sets disposed between said input shaft and said output shaft;

a plurality of fluid operated friction devices for selectively establishing a plurality of ratios in said planetary gear sets, one of said planetary gear sets having a first member controlled to a zero speed by a first of said friction devices and a second member controlled to a zero speed by a second of said friction devices;

means for determining a vehicle speed and a vehicle operating condition; and means for actuating said second friction device when a zero vehicle speed is determined and said first friction device is actuated;

said friction devices being controlled to provide at least five forward ratios and one reverse ratio, and said first of said friction devices is normally engaged for a first forward speed and said second of said friction devices is normally engaged for a second forward speed and simultaneous engagement of said first and second of said friction devices prevents rotation of said output shaft.

2. The power transmission and control in a vehicle as defined in claim 1 further wherein a third of said friction devices is normally engaged during at least three of said forward ratios and is disengaged during simultaneous engagement of the first and second of said friction devices.

3. The power transmission and control in a vehicle as defined in claim 1 further wherein a third of said friction devices is normally engaged during at least three of said forward ratios and is also engaged during simultaneous engagement of said first and second of said friction devices.

* * * * *